United States Patent
Fujimoto et al.

(10) Patent No.: US 10,436,320 B2
(45) Date of Patent: Oct. 8, 2019

(54) TRANSMISSION STRUCTURE FOR VEHICLE

(71) Applicant: HONDA MOTOR CO., LTD., Tokyo (JP)

(72) Inventors: Yasushi Fujimoto, Wako (JP); Taku Hirayama, Wako (JP); Hiroyuki Makita, Wako (JP); Yukio Yokogawa, Wako (JP)

(73) Assignee: HONDA MOTOR CO. LTD., Tokyo (JP)

( * ) Notice: Subject to any disclaimer, the term of this patent is extended or adjusted under 35 U.S.C. 154(b) by 330 days.

(21) Appl. No.: 15/447,301

(22) Filed: Mar. 2, 2017

(65) Prior Publication Data

US 2017/0268670 A1    Sep. 21, 2017

(30) Foreign Application Priority Data

Mar. 18, 2016    (JP) .................................. 2016-055939

(51) Int. Cl.

| | |
|---|---|
| *F16H 63/16* | (2006.01) |
| *B62M 11/06* | (2006.01) |
| *B62M 25/08* | (2006.01) |
| *F16H 61/32* | (2006.01) |
| *B62M 25/06* | (2006.01) |

(Continued)

(52) U.S. Cl.
CPC .............. *F16H 63/16* (2013.01); *B62K 23/08* (2013.01); *B62M 11/06* (2013.01); *B62M 25/06* (2013.01); *B62M 25/08* (2013.01); *F16H 61/32* (2013.01); *F16H 63/18* (2013.01); *F16H 2057/02065* (2013.01); *F16H 2063/3093* (2013.01)

(58) Field of Classification Search
CPC .......... F16H 63/16; F16H 61/32; F16H 63/18; F16H 2063/3089; B62K 23/08; B62M 11/06; B62M 25/06; B62M 25/08
See application file for complete search history.

(56) References Cited

U.S. PATENT DOCUMENTS

| | | | |
|---|---|---|---|
| 3,321,988 A | * 5/1967 | Lucien ....................... | F16D 3/72 464/97 |
| 4,287,791 A | * 9/1981 | Numazawa ............. | F16H 3/089 464/180 |

(Continued)

FOREIGN PATENT DOCUMENTS

JP    3595727    9/2004

OTHER PUBLICATIONS

Canadian Office Action dated May 14, 2018, 6 pages.

*Primary Examiner* — Zakaria Elahmadi
(74) *Attorney, Agent, or Firm* — Rankin, Hill & Clark LLP

(57) ABSTRACT

A transmission structure for a vehicle, the transmission structure including: a transmission having a plurality of speed change stages, the transmission including a speed change operation mechanism that has an output portion receiving an input motion produced by an actuator as an operation driving source and changing a speed change stage of the transmission, and a transmission case that houses the speed change operation mechanism, a part of the speed change operation mechanism being a torsion bar as a torque transmitting member, and a rear end gear being disposed on an end portion of the torsion bar; the transmission case including a boss portion holding an intermediate portion in an axial direction of the torsion bar.

20 Claims, 14 Drawing Sheets

(51) Int. Cl.
    *B62K 23/08*     (2006.01)
    *F16H 63/18*     (2006.01)
    *F16H 63/30*     (2006.01)
    *F16H 57/02*     (2012.01)

(56) References Cited

U.S. PATENT DOCUMENTS

| | | | | |
|---|---|---|---|---|
| 4,754,659 A * | 7/1988 | Rietsch | F16H 3/093 | 464/160 |
| 5,761,959 A * | 6/1998 | Winter | B60K 17/28 | 74/15.66 |
| 2007/0158161 A1* | 7/2007 | Fujimoto | F16H 63/3416 | 192/219.4 |
| 2009/0084208 A1* | 4/2009 | Hayakawa | F16H 59/68 | 74/325 |
| 2009/0222182 A1* | 9/2009 | Tomoda | F16D 25/086 | 701/67 |
| 2010/0077884 A1* | 4/2010 | Ono | B60K 17/04 | 74/473.36 |
| 2010/0107792 A1* | 5/2010 | Saitoh | F16H 63/18 | 74/337.5 |
| 2010/0107809 A1* | 5/2010 | Saitoh | F16H 3/006 | 74/664 |
| 2011/0239805 A1* | 10/2011 | Fujimoto | F16H 59/70 | 74/473.12 |
| 2012/0247238 A1* | 10/2012 | Mizuno | F16H 3/006 | 74/6 |
| 2013/0055841 A1* | 3/2013 | Nakamura | B62M 25/06 | 74/473.16 |
| 2013/0255415 A1* | 10/2013 | Adachi | F16H 59/042 | 74/337.5 |
| 2014/0053671 A1* | 2/2014 | Matsumoto | F16H 3/083 | 74/335 |
| 2014/0083228 A1* | 3/2014 | Mitsubori | F16H 63/18 | 74/473.36 |
| 2014/0290405 A1* | 10/2014 | Sugano | F16H 3/02 | 74/335 |
| 2015/0135691 A1* | 5/2015 | Yajima | F16H 63/14 | 60/323 |
| 2015/0176706 A1* | 6/2015 | Saitoh | F16H 63/38 | 74/473.36 |
| 2015/0306976 A1* | 10/2015 | Park | B60K 17/08 | 318/3 |
| 2016/0091088 A1* | 3/2016 | Fujimoto | F16H 61/32 | 74/335 |
| 2016/0123464 A1* | 5/2016 | Takahashi | F16H 63/18 | 74/745 |
| 2016/0137260 A1* | 5/2016 | Yajima | F16H 63/14 | 74/473.1 |
| 2017/0254410 A1* | 9/2017 | Dorschel | F16H 61/26 | |
| 2018/0209538 A1* | 7/2018 | Makita | F16H 61/32 | |

* cited by examiner

TRANSMISSION STRUCTURE FOR VEHICLE

INCORPORATION BY REFERENCE

The present application claims priority under 35 U.S.C. § 119 to Japanese Patent Application No. 2016-055939, filed Mar. 18, 2016. The contents of this application are incorporated herein by reference in their entirety.

TECHNICAL FIELD

The present invention relates to a transmission structure for a vehicle.

BACKGROUND ART

Conventionally, a torsion bar is used as a shift shaft of an electric shift mechanism of a transmission (see Patent Document 1, for example).

PRIOR ART DOCUMENT

Patent Document

[Patent Document 1]
Japanese Patent No. 3595727

SUMMARY OF THE INVENTION

Problem to be Solved by the Invention

When the torsion bar of Patent Document 1 is employed, and the torsion bar has a long distance between an output end side thereof provided with a gear and an input end side thereof provided with a lever, that is, the torsion bar has a long overall length, bending may occur in the torsion bar in addition to torsion, depending on a method of supporting the torsion bar. The gears are thereby in partial meshing contact with each other. Thus, uneven wear of the gears occurs, so that the durability of the gears is decreased.

It is an object of the present invention to provide a transmission structure for a vehicle which structure can improve the durability of a gear provided to a torsion bar.

Means for Solving the Problem

In order to solve the above-described problem, according to an aspect of the present invention, there is provided a transmission structure for a vehicle, the transmission structure including: a transmission (82) having a plurality of speed change stages, the transmission (82) including a speed change operation mechanism (170) that has an output portion (178) receiving an input motion produced by an actuator (171) as an operation driving source and changing a speed change stage of the transmission (82), and a transmission case (160) that houses the speed change operation mechanism (170), a part of the speed change operation mechanism (170) being a torsion bar (173c) as a torque transmitting member, and a gear (173b) being disposed on an end portion of the torsion bar (173c). In the transmission structure for a vehicle, the transmission case (160) includes a holding portion (162s) holding an intermediate portion in an axial direction of the torsion bar (173c).

In the above constitution, the gear (173b) may be molded integrally with an output side end portion of the torsion bar (173c).

In addition, in the above constitution, a part of the torsion bar (173c), the part being supported by the holding portion (162s), may be formed so as to have a larger diameter than a diameter of a central portion in the axial direction of the torsion bar (173c).

In addition, in the above constitution, a bearing (193) may be disposed between the holding portion (162s) and the torsion bar (173c).

In addition, in the above constitution, an end portion of the torsion bar (173c) on an opposite side of the gear (173b) from the holding portion (162s) may be rotatably supported by the transmission case (160).

In addition, in the above constitution, the transmission case (160) includes a removable transmission holder (162) supporting one end of a speed change shaft (108) of the transmission (82), and the holding portion (162s) may be formed integrally with the transmission holder (162).

In addition, in the above constitution, the transmission holder (162) has a circular through hole (162h) that the torsion bar (173c) passes through, and the holding portion (162s) may be formed so as to protrude in a tubular shape from a circumferential edge of the circular through hole (162h).

In addition, in the above constitution, an end of the holding portion (162s) may extend to a position in proximity to a side of the gear (173b).

Effects of the Invention

According to an aspect of the present invention, the transmission case includes the holding portion holding the intermediate portion in the axial direction of the torsion bar. Thus, when the torque of the torsion bar is transmitted from the input side end portion to the output side end portion of the torsion bar, the holding portion suppresses bending deformation of the torsion bar, thereby making it possible to prevent uneven wear resulting from partial contact of the gear with a mating gear meshing with the gear, and thus improve the durability of the gear and the mating gear.

In addition, the gear is molded integrally with the output side end portion of the torsion bar. Hence, it is possible to reduce the number of parts and the number of assembly man-hours of the speed change operation mechanism, and thus reduce cost.

In addition, the part of the torsion bar which part is supported by the holding portion is formed so as to have a larger diameter than that of the central portion in the axial direction of the torsion bar. Thus, the bending deformation can be suppressed as much as possible by the large-diameter part of the torsion bar, so that the durability of the gear can be improved.

In addition, the bearing is disposed between the holding portion and the torsion bar. It is thus possible to suppress the bending deformation while reducing the rotational resistance of the torsion bar.

In addition, the end portion of the torsion bar on the opposite side of the gear from the holding portion is rotatably supported by the transmission case. Thus, inclination of the gear can be suppressed by supporting both sides of the gear by the holding portion and the transmission case. It is therefore possible to prevent wear due to partial contact of the gear, and thereby improve the durability and transmission efficiency of the gear.

In addition, the transmission case includes the removable transmission holder supporting one end of the speed change shaft of the transmission, and the holding portion is formed integrally with the transmission holder. Thus, the holding portion can be supported by the transmission holder supporting the speed change shaft of the transmission. An increase in the number of parts is therefore suppressed. In addition, by forming the holding portion on the transmission holder, it is possible to increase a degree of freedom of the formation of the holding portion as compared with formation of the holding portion on the main body side of the transmission case.

In addition, the transmission holder has a circular through hole that the torsion bar passes through, and the holding portion is formed so as to protrude in a tubular shape from the circumferential edge of the circular through hole. Thus, by protruding the holding portion, it is possible to reinforce the periphery of the through hole, and compensate for a decrease in rigidity due to the formation of the through hole.

In addition, the end of the holding portion extends to the position in proximity to the side of the gear. Thus, the torsion bar can be supported in closer vicinity to the gear. The partial contact of the gear is consequently further reduced, so that the transmission efficiency and durability of the gear can be improved.

MODE FOR CARRYING OUT THE INVENTION

An embodiment of the present invention will hereinafter be described with reference to the drawings. Incidentally, in the description, directions such as front and rear, left and right, and up and down are the same as directions with respect to a vehicle body unless otherwise specified. In addition, symbol FR shown in figures indicates a forward direction of the vehicle body, symbol UP indicates an upward direction of the vehicle body, and symbol LH indicates a leftward direction of the vehicle body.

Figure 1:
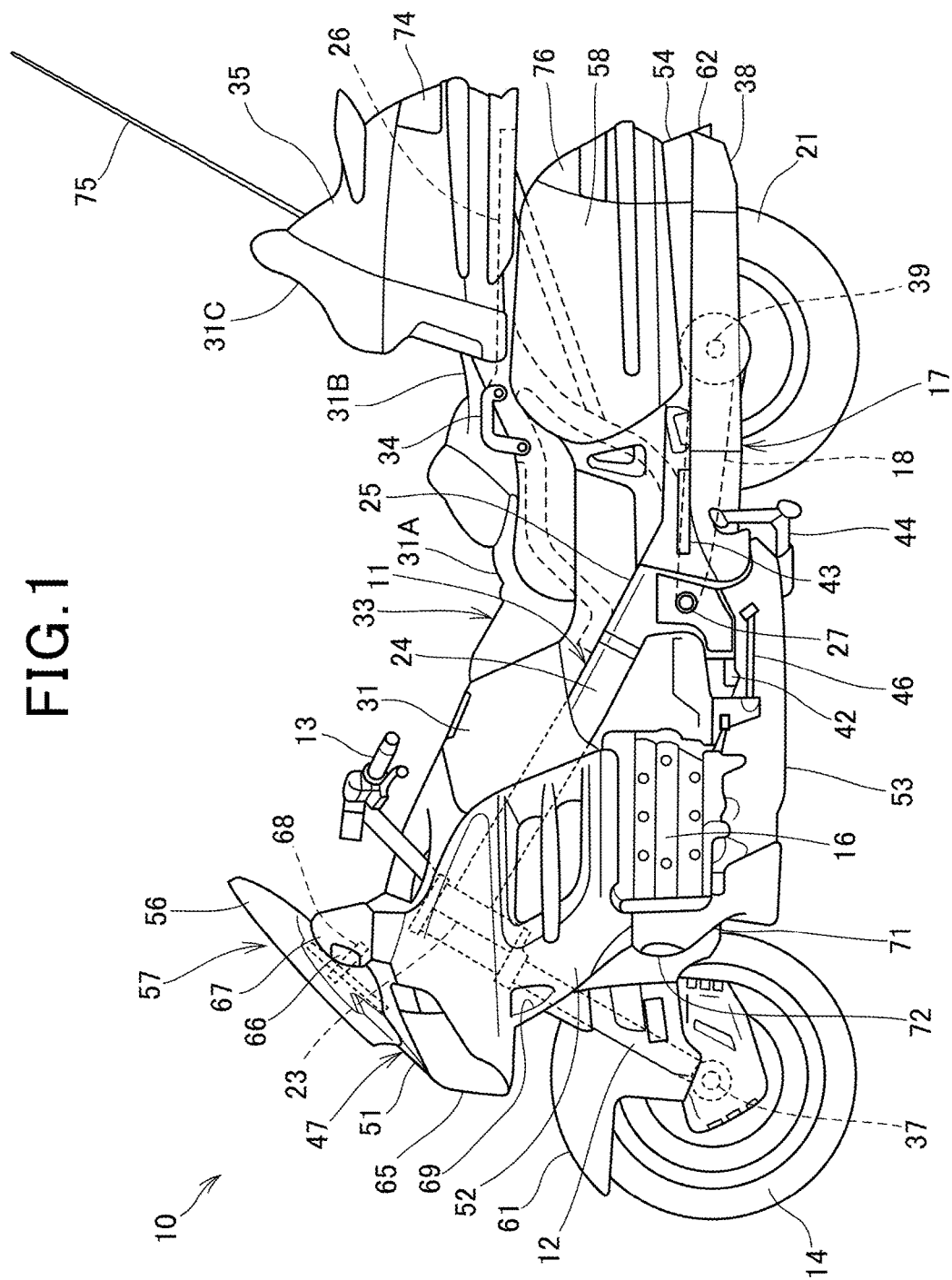
FIG. 1 is a left side view showing a motorcycle including an automatic speed change transmission having a transmission structure for a vehicle according to the present invention.

FIG. 1 is a left side view showing a motorcycle 10 including an automatic speed change transmission 82 having a transmission structure for a vehicle according to the present invention.

The motorcycle 10 is a vehicle including a vehicle body frame 11, a front fork 12, handlebars 13, a front wheel 14, a power unit 16, an exhaust device 17, a rear fork 18, and a rear wheel 21.

The vehicle body frame 11 includes a head pipe 23, a pair of left and right main frames 24, a pair of left and right pivot plates 25, and a pair of left and right seat rails 26.

The head pipe 23 is disposed as a front end portion of the vehicle body frame 11, and steerably supports the front fork 12. The main frames 24 rearwardly and obliquely downwardly extend on the left and right from the head pipe 23. The power unit 16 is supported below the main frames 24. A fuel tank 31 is supported on the main frames 24. The pivot plates 25 are connected to rear portions of the main frames 24. The seat rails 26 extend rearward and obliquely upward from front portions and rear portions of the pivot plates 25. A seat 33 is supported by front portions of the seat rails 26. Grab rails 34 and a trunk box 35 are supported by rear portions of the seat rails 26.

The handlebars 13 are attached to an upper portion of the front fork 12. The front wheel 14 is supported by a lower portion of the front fork 12 via an axle 37. The exhaust device 17 includes an exhaust pipe (not shown) extending from the power unit 16 and a muffler 38 attached to a rear end of the exhaust pipe.

The rear fork 18 is supported vertically swingably by a pivot shaft 27 provided to the pivot plates 25. The rear wheel 21 is supported by an axle 39 provided to a rear end portion of the rear fork 18. A rear cushion unit (not shown) is disposed between the rear end portion of the rear fork 18 and the vehicle body frame 11.

The seat 33 is disposed in the rear of the fuel tank 31. The seat 33 includes: a driver seat 31A on which a driver is seated; a passenger seat 31B that is formed one step higher than the driver seat 31A and in the rear of the driver seat 31A, and on which a passenger is seated; and a backrest portion 31C for the passenger. In addition, a pair of left and right driver steps 42 on which the driver puts feet thereof and a pair of left and right passenger steps 43 on which the passenger puts feet thereof are attached to the pivot plates 25 of the vehicle body frame 11. In addition, a main stand 44, a side stand 46, and a vehicle body cover 47 are attached to the vehicle body frame 11.

The vehicle body cover 47 includes: a front cowl 51 that covers a front of the vehicle body; a pair of left and right side cowls 52 that cover side portions of the vehicle body; an under cowl 53 that covers a lower portion of the vehicle body; and a rear cowl 54 that covers a rear portion of the vehicle body. The front cowl 51 is provided with a windshield device 57 that automatically moves a windscreen 56 vertically. A pair of left and right side bags 58 is formed integrally with the rear cowl 54. In addition, a front fender 61 that covers the front wheel 14 from above is attached to the front fork 12, and a rear fender 62 that covers the rear wheel 21 from above is attached to the rear cowl 54.

The front cowl 51 has a front surface provided with a headlight 65, has an upper portion provided with the windscreen 56, and has a left end and a right end provided with a pair of left and right mirrors 67 each including a front turn signal 66. A meter 68 is disposed on the inside of the front cowl 51.

The side cowl 52 is provided with a pair of left and right air openings 69 for supplying outside air from the front of the vehicle to the periphery of the power unit 16. In addition, a pair of left and right engine guards 71 is provided to a left front portion and a right front portion of the power unit 16. A fog lamp 72 is attached to each of the engine guards 71.

The trunk box 35 has a back surface provided with a pair of left and right taillight units 74, and has a right side portion provided with a rod antenna 75 used when an audio unit receives a radio broadcast. Rear turn signals 76 are arranged in back surfaces of the side bags 58.

Figure 2:
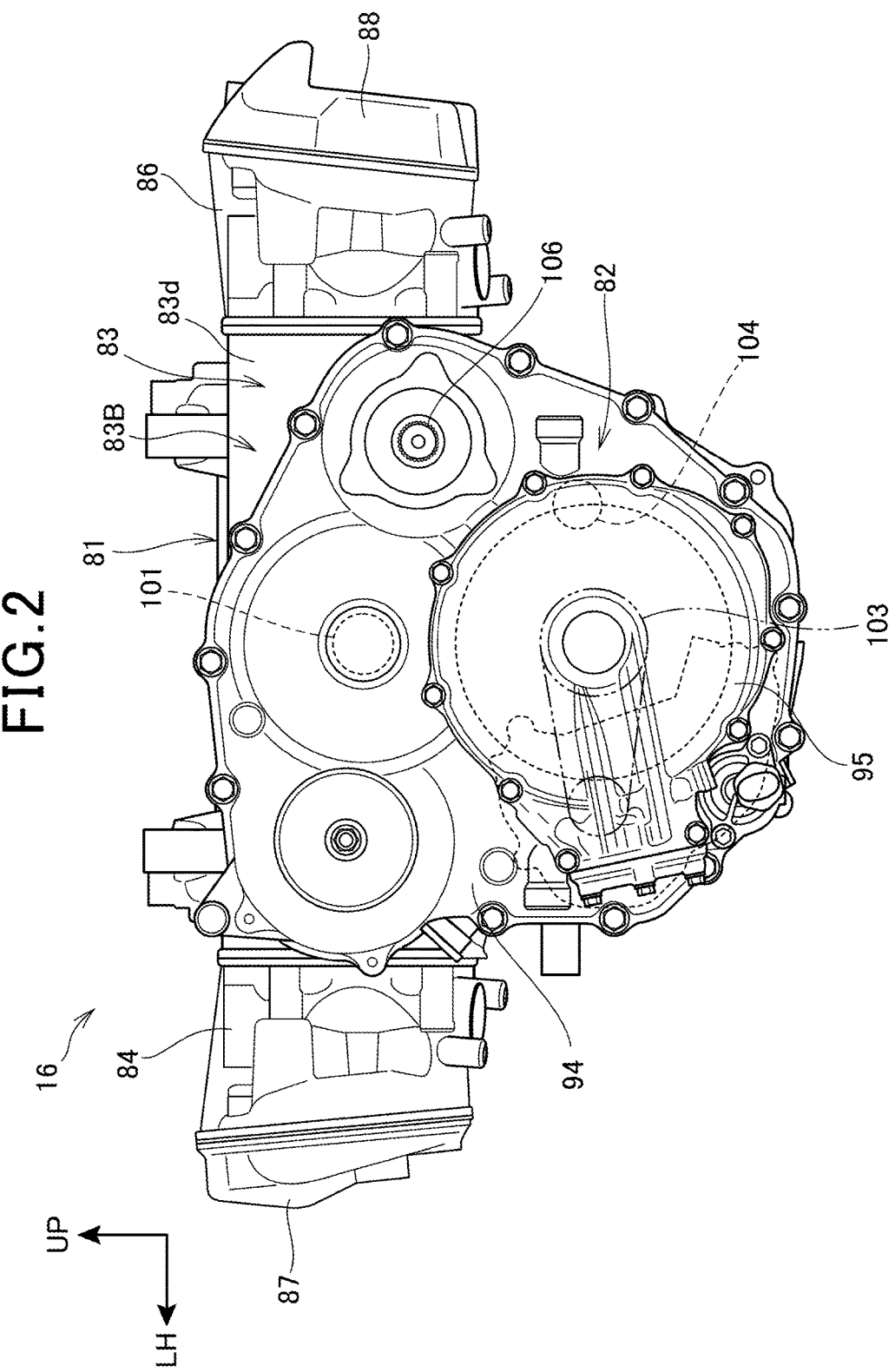
FIG. 2 is a rear view showing a power unit.
Figure 3:
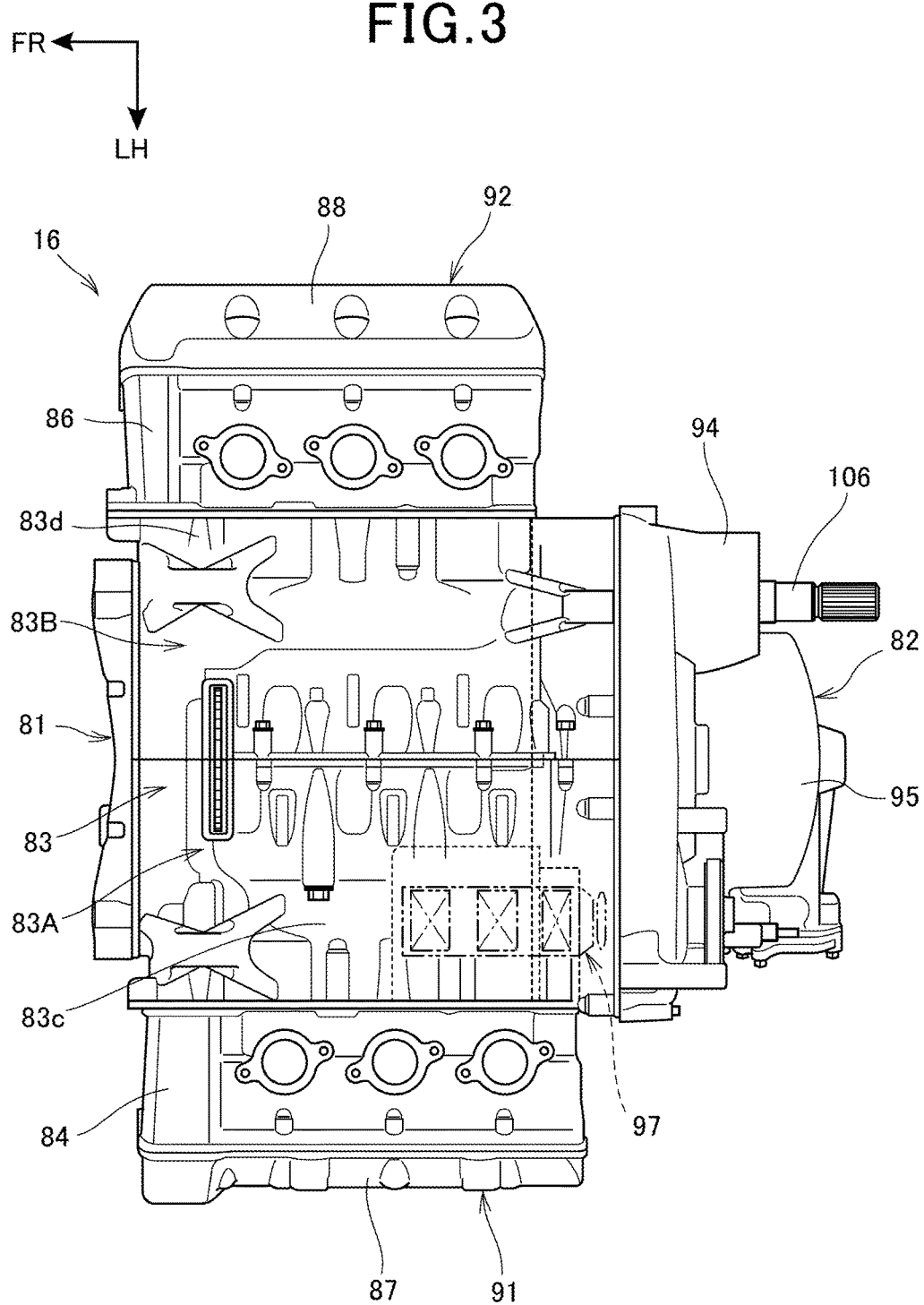
FIG. 3 is a plan view showing the power unit.

FIG. 2 is a rear view showing the power unit 16. FIG. 3 is a plan view showing the power unit 16.

As shown in FIG. 2 and FIG. 3, the power unit 16 includes: an internal combustion engine 81 that constitutes an upper portion of the power unit 16; and the automatic speed change transmission 82 disposed integrally with a lower portion and a rear portion of the internal combustion engine 81.

The internal combustion engine 81 is of a horizontally opposed type. The internal combustion engine 81 includes: a crankcase 83 disposed in a center in a vehicle width direction; a left cylinder head 84 and a right cylinder head 86 attached so as to extend horizontally to the outside in the vehicle width direction of the crankcase 83; and a left head cover 87 and a right head cover 88 that close openings of the left cylinder head 84 and the right cylinder head 86, respectively.

The crankcase 83 is constituted of a left case 83A and a right case 83B divided left and right. A left end portion 83c projecting leftward of the left case 83A, the left cylinder head 84, and the left head cover 87 constitute a left cylinder portion 91. In addition, a right end portion 83d projecting rightward of the right case 83B, the right cylinder head 86, and the right head cover 88 constitute a right cylinder portion 92.

A rear crank cover 94 is attached to a rear end surface of the crankcase 83. In addition, a clutch cover 95 that bulges in the shape of a bowl toward the rear of the vehicle body is attached to a center of a lower portion of the rear crank cover 94. A clutch 112 (see FIG. 14) is disposed on the inside of the clutch cover 95. Incidentally, reference symbol 97 denotes an oil pump unit disposed within the left case 83A.

The internal combustion engine 81 includes a crankshaft 101 housed so as to extend in a forward-rearward direction of the vehicle within the crankcase 83. In addition, the transmission 82 includes a main shaft 103 below the crankshaft 101, a counter shaft 104 on the right of the main shaft 103, and an output shaft 106 on the right of and obliquely above the counter shaft 104. The main shaft 103, the counter shaft 104, and the output shaft 106 are each arranged in parallel with the crankshaft 101.

The main shaft 103 and the counter shaft 104 are provided with a plurality of stages of gear trains capable of selective power transmission at different gear ratios. Meshing combinations of gear elements of these gear trains are made by shift operation of an electric motor 171 (see FIG. 5). The output shaft 106 projects toward the rear of the vehicle body from the rear crank cover 94. The output shaft 106 rotates by receiving power from the counter shaft 104, and transmits the rotation to the rear wheel 21 (see FIG. 1) via a power transmitting member such as a drive shaft.

Figure 4:
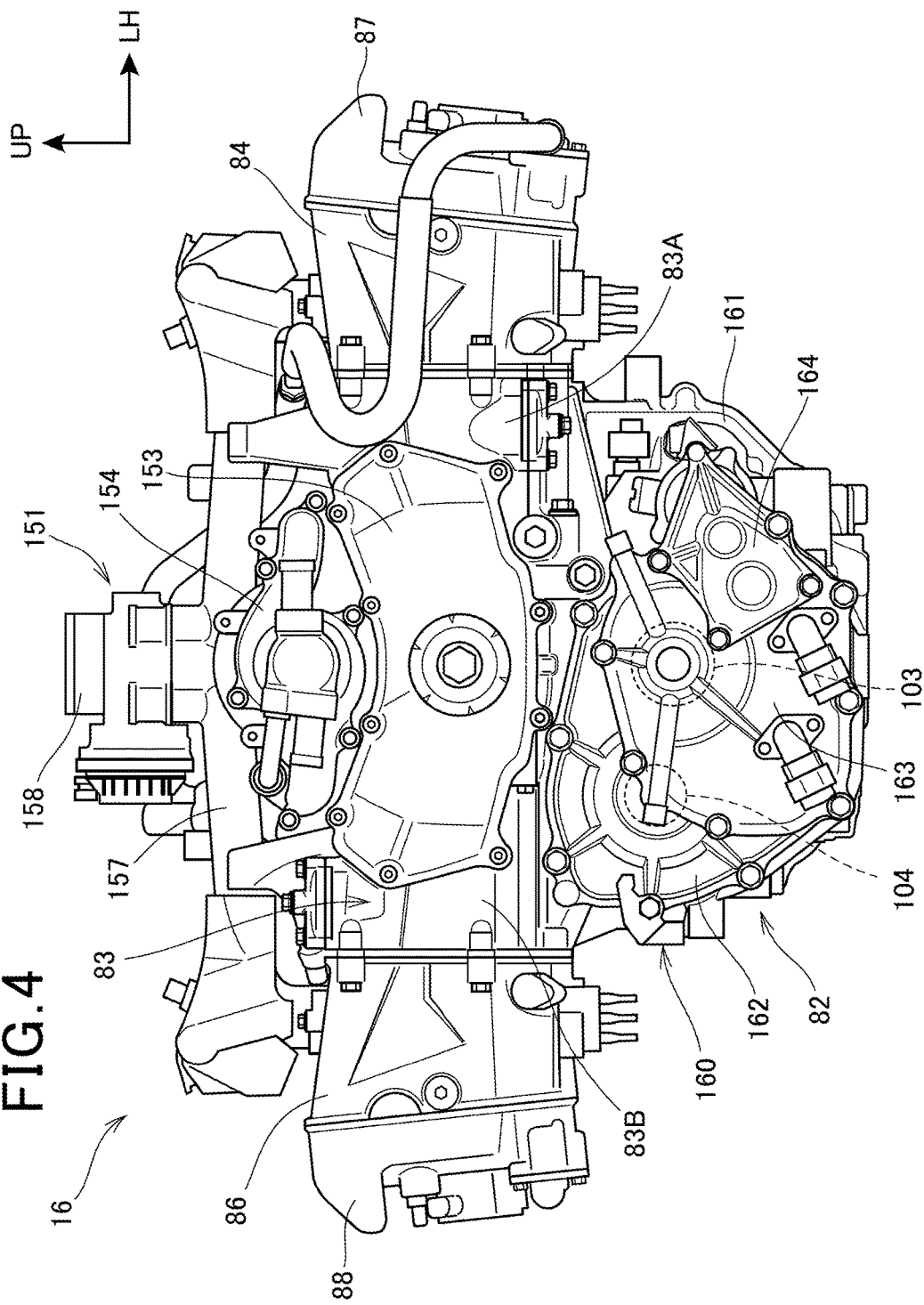
FIG. 4 is a front view showing the power unit.

FIG. 4 is a front view showing the power unit 16.

The power unit 16 is provided with an intake device 151 above the crankcase 83, and provided with the transmission 82 below the crankcase 83.

A front cover 153 is attached to a front end portion of the crankcase 83. Incidentally, reference symbol 154 denotes a water pump attached to the crankcase 83 above the front cover 153.

The intake device 151 includes an intake manifold 157 attached to the left cylinder head 84 and the right cylinder head 86 and a throttle body 158 connected to an upper portion of the intake manifold 157.

The transmission 82 includes a transmission case 160 that houses shafts (the main shaft 103, the counter shaft 104, and the like shown in FIG. 2), speed change gears, and the like. The transmission case 160 includes a transmission case main body 161, a transmission holder 162 detachably attached to a front end portion of the transmission case main body 161, and a transmission cover 163 attached to a front end portion of the transmission holder 162. Incidentally, reference symbol 164 denotes a transmission sub-cover attached to the transmission cover 163.

The main shaft 103 and the counter shaft 104 described above constitute a speed change shaft 108.

Figure 5:
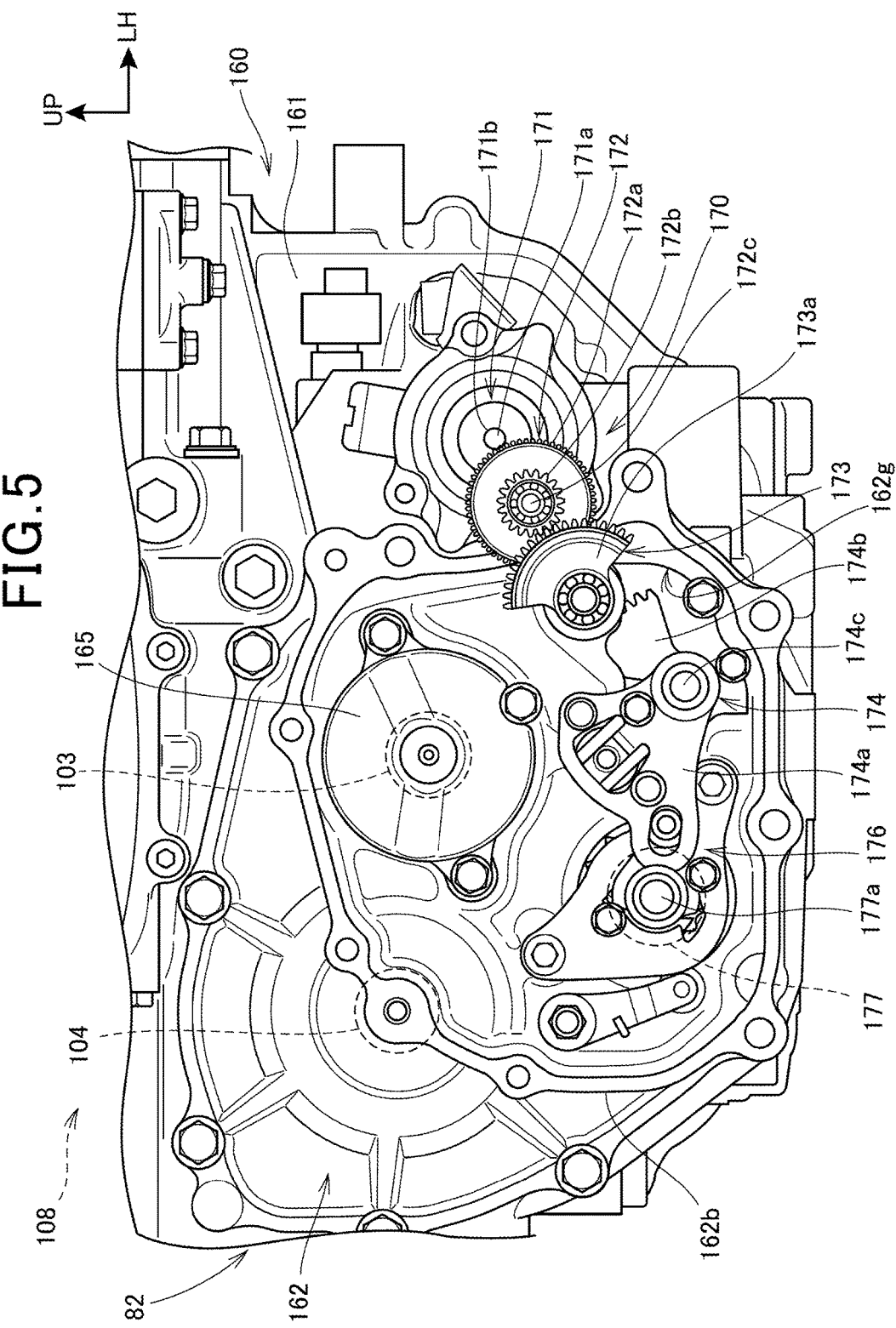
FIG. 5 is a fragmentary front view of a transmission in a state in which a transmission cover in FIG. 4 is removed.

FIG. 5 is a fragmentary front view of the transmission 82 in a state in which the transmission cover 163 in FIG. 4 is removed.

The transmission holder 162 supports respective front end portions of the main shaft 103 and the counter shaft 104, and supports a part of a speed change operation mechanism 170. The speed change operation mechanism 170 receives an input motion provided by a speed change operation, and selects a speed change stage gear, thereby switching a speed change stage. Incidentally, reference symbol 165 denotes a shaft end cover attached to the transmission holder 162 to cover the front end portion of the main shaft 103 and a bearing supporting the front end portion of the main shaft 103.

Figure 14:
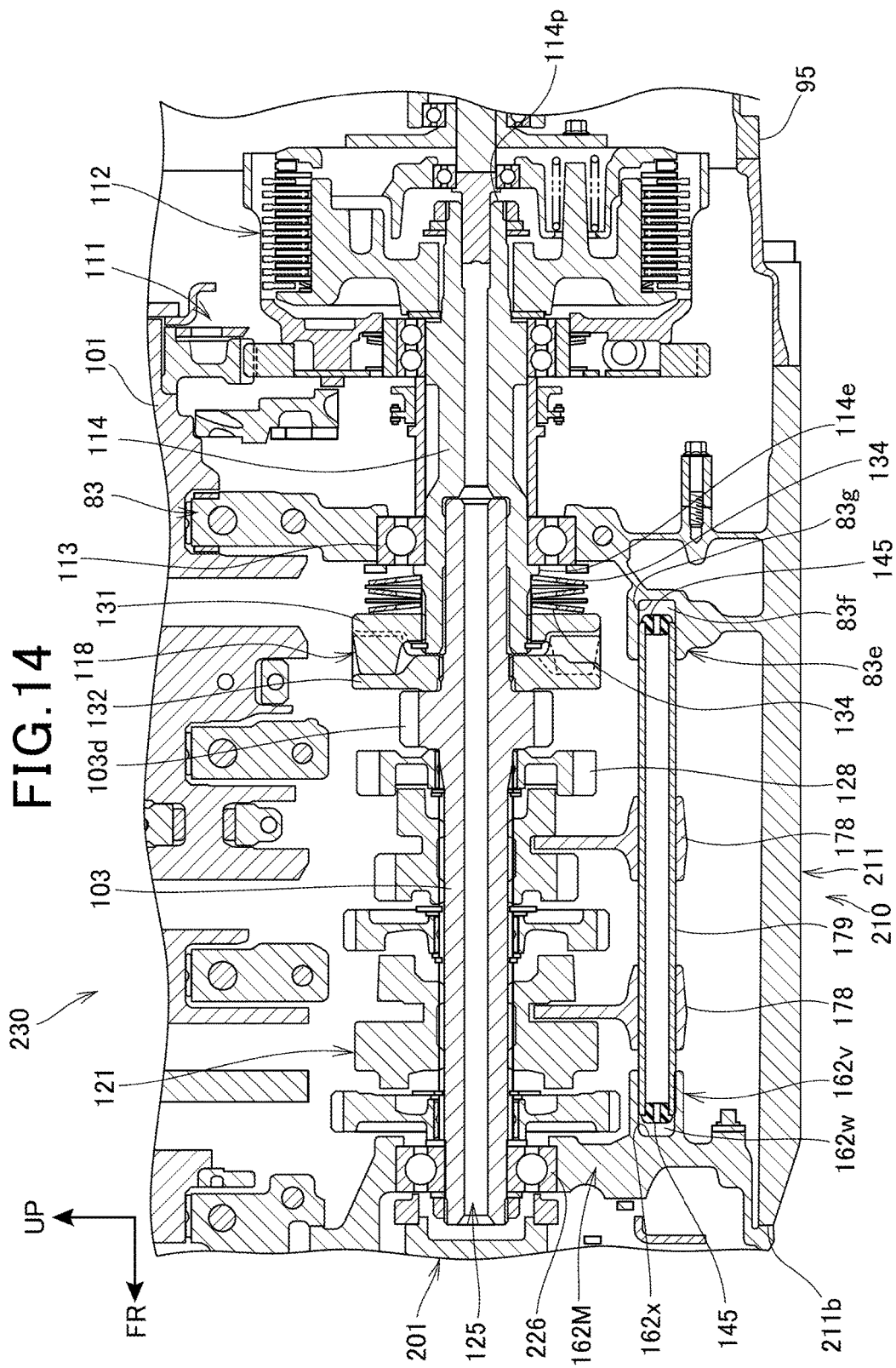
FIG. 14 is a sectional view showing a power unit including the transmission.

The speed change operation mechanism 170 includes the electric motor 171, a reduction gear 172, a torsion bar assembly 173, a shift shaft 174, a shift drum 177, and shift forks 178 (see FIG. 14).

The electric motor 171 has a pinion 171b formed on a rotary shaft 171a of the electric motor 171. The reduction gear 172 includes a large-diameter gear 172a meshing with the pinion 171b of the electric motor 171 and a small-diameter gear 172b having a smaller number of teeth than that of the large-diameter gear 172a. The torsion bar assembly 173 is a shaft extending forward from the transmission case main body 161 side. A sector gear 173a that meshes with the small-diameter gear 172b of the reduction gear 172 is fixed to a front end portion of the torsion bar assembly 173.

The shift shaft 174 includes: a shift arm 174a disposed in an intermediate portion in an axial direction of the shift shaft 174; and a sectorial shaft gear 174b disposed in a rear end portion of the shift shaft 174. The shift arm 174a is coupled to the shift drum 177 via a coupling mechanism 176. The shaft gear 174b is in mesh with a rear end gear 173b (see FIG. 10) disposed on a rear end portion of the torsion bar assembly 173. A plurality of the shift forks 178 (see FIG. 14) are coupled to the shift drum 177. The shift forks 178 are engaged with a main shaft gear group (not shown) provided to the main shaft 103 and a counter shaft gear group (not shown) provided to the counter shaft 104. Incidentally, reference symbol 177a denotes a shift drum shaft extending forward from the shift drum 177.

Description will next be made of speed change operation by the speed change operation mechanism 170.

When the electric motor 171 is driven, a rotation of the rotary shaft 171a is transmitted to the torsion bar assembly 173 via the reduction gear 172, and is further transmitted from the torsion bar assembly 173 to the shift shaft 174. Then, swinging of the shift arm 174a provided to the shift shaft 174 is converted into a rotation of the shift drum 177 via the coupling mechanism 176. According to the rotation of the shift drum 177, the shift forks 178 move predetermined speed change gears in the axial direction of the main shaft 103 and the counter shaft 104. A desired speed change stage can be thereby selected.

Figure 6:
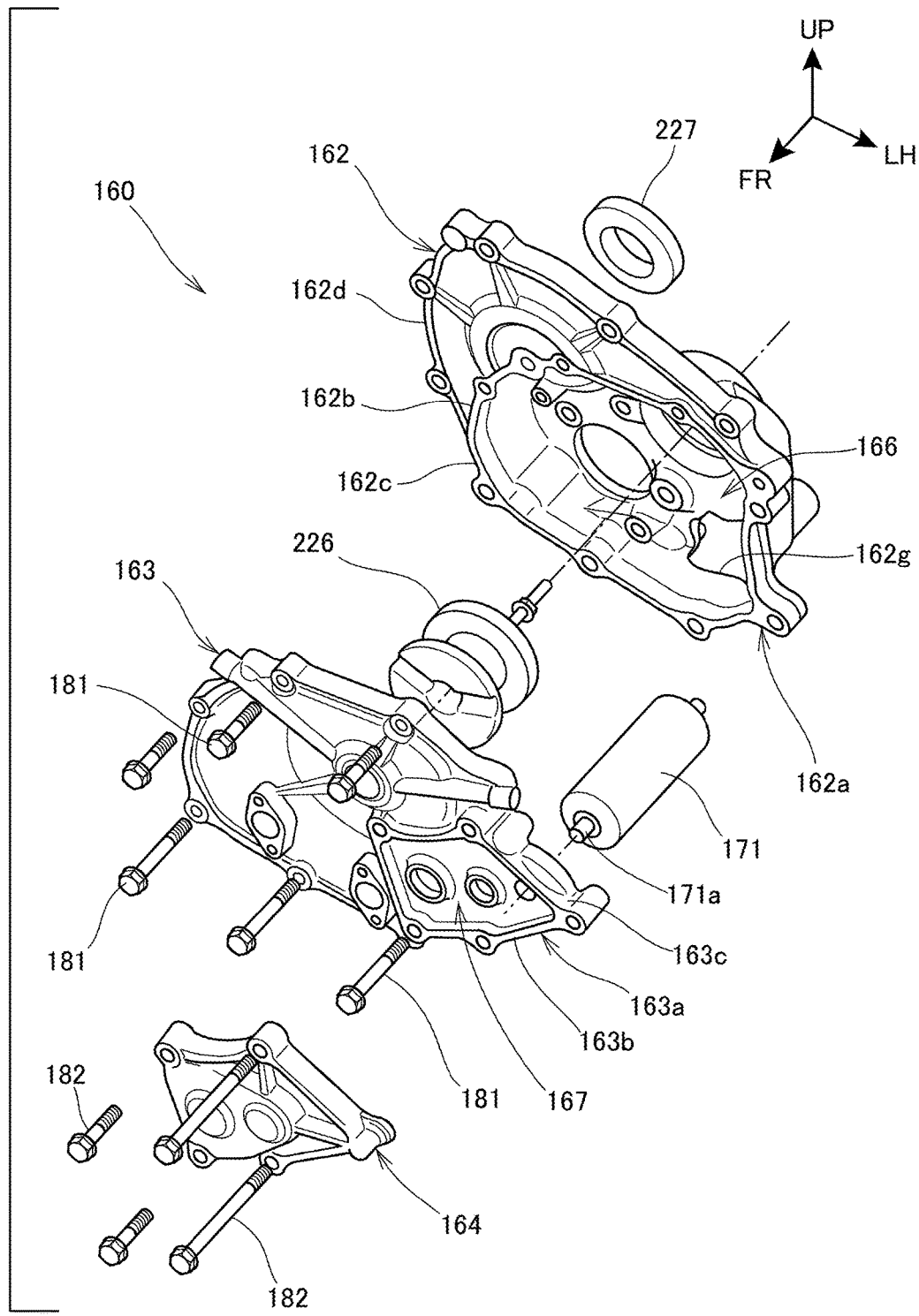
FIG. 6 is an exploded perspective view showing a front portion of a transmission case.

FIG. 6 is an exploded perspective view showing a front portion of the transmission case 160.

The transmission holder 162 is fastened to a front end surface 211b (see FIG. 14) of the transmission case main body 161 (see FIG. 5) by a plurality of bolts (not shown). The transmission cover 163 is fastened to a front end surface 162a of the transmission holder 162 by a plurality of bolts 181. A first speed change operation chamber 166 surrounded by a peripheral wall 162b formed on the transmission holder 162 is formed between the transmission holder 162 and the transmission cover 163. The front end surface 162a of the transmission holder 162 is constituted of: a peripheral wall front end surface 162c formed on the peripheral wall 162b; and a right side front end surface 162d formed so as to extend from the peripheral wall front end surface 162c and so as to be continuous with an edge on a right side of the transmission holder 162.

The first speed change operation chamber 166 houses the shift arm 174a of the shift shaft 174, the coupling mechanism 176, the shift drum shaft 177a, and the like shown in FIG. 5.

In FIG. 6, a cover side projecting portion 163a having a part thereof projecting leftward in the vehicle width direction is formed integrally with the transmission cover 163. The transmission sub-cover 164 is fastened to a front end surface 163b of the cover side projecting portion 163a by a plurality of bolts 182.

The electric motor 171 is disposed in the rear of the cover side projecting portion 163a. The rotary shaft 171a of the electric motor 171 penetrates the cover side projecting portion 163a and projects forward. A second speed change operation chamber 167 surrounded by a peripheral wall 163c formed on the cover side projecting portion 163a is formed between the cover side projecting portion 163a and the transmission sub-cover 164. The front end surface 163b of the cover side projecting portion 163a is formed on the peripheral wall 163c. The reduction gear 172 and the sector gear 173a shown in FIG. 5 are arranged in the second speed change operation chamber 167.

Figure 7:
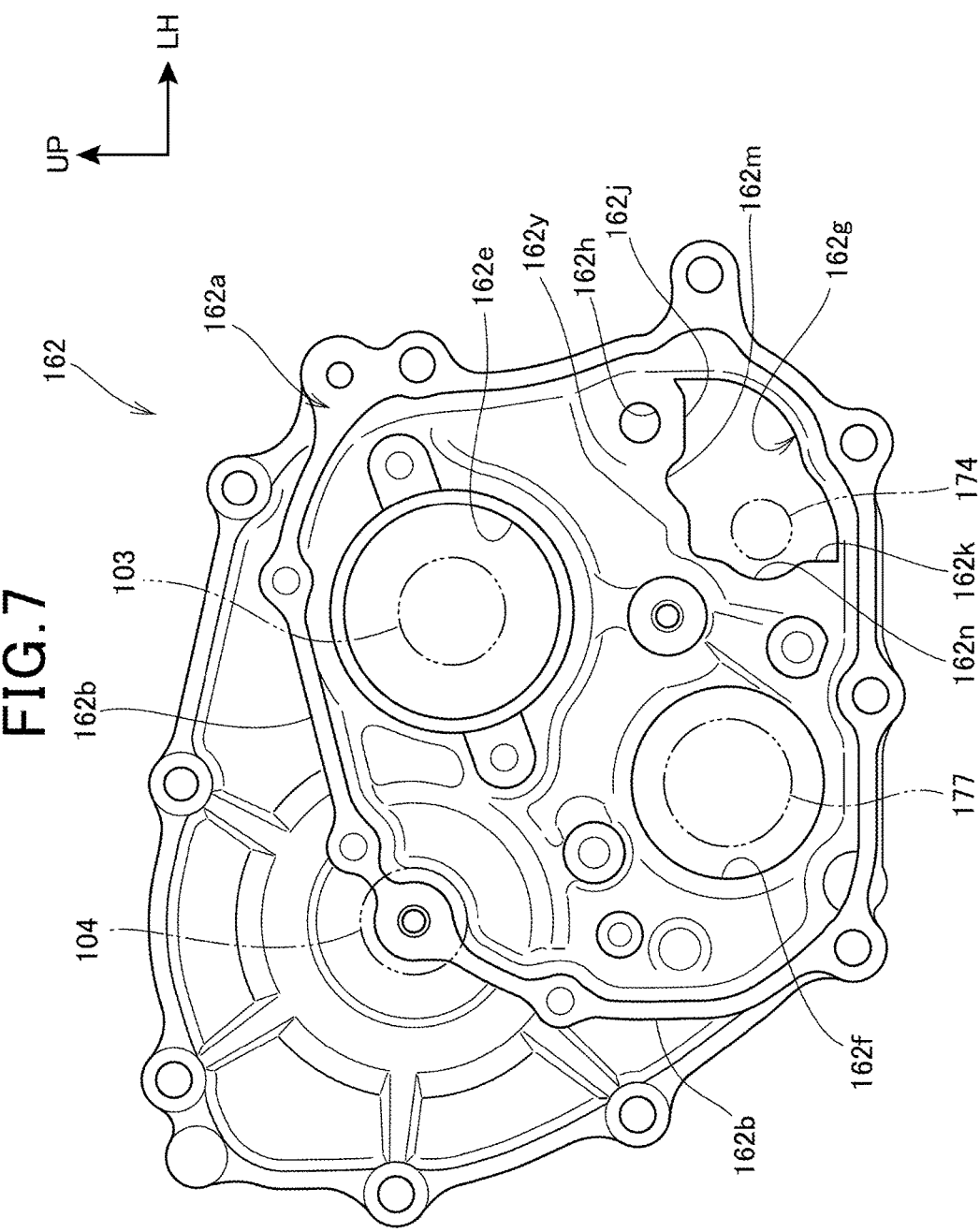
FIG. 7 is a front view showing a transmission holder.
Figure 8:
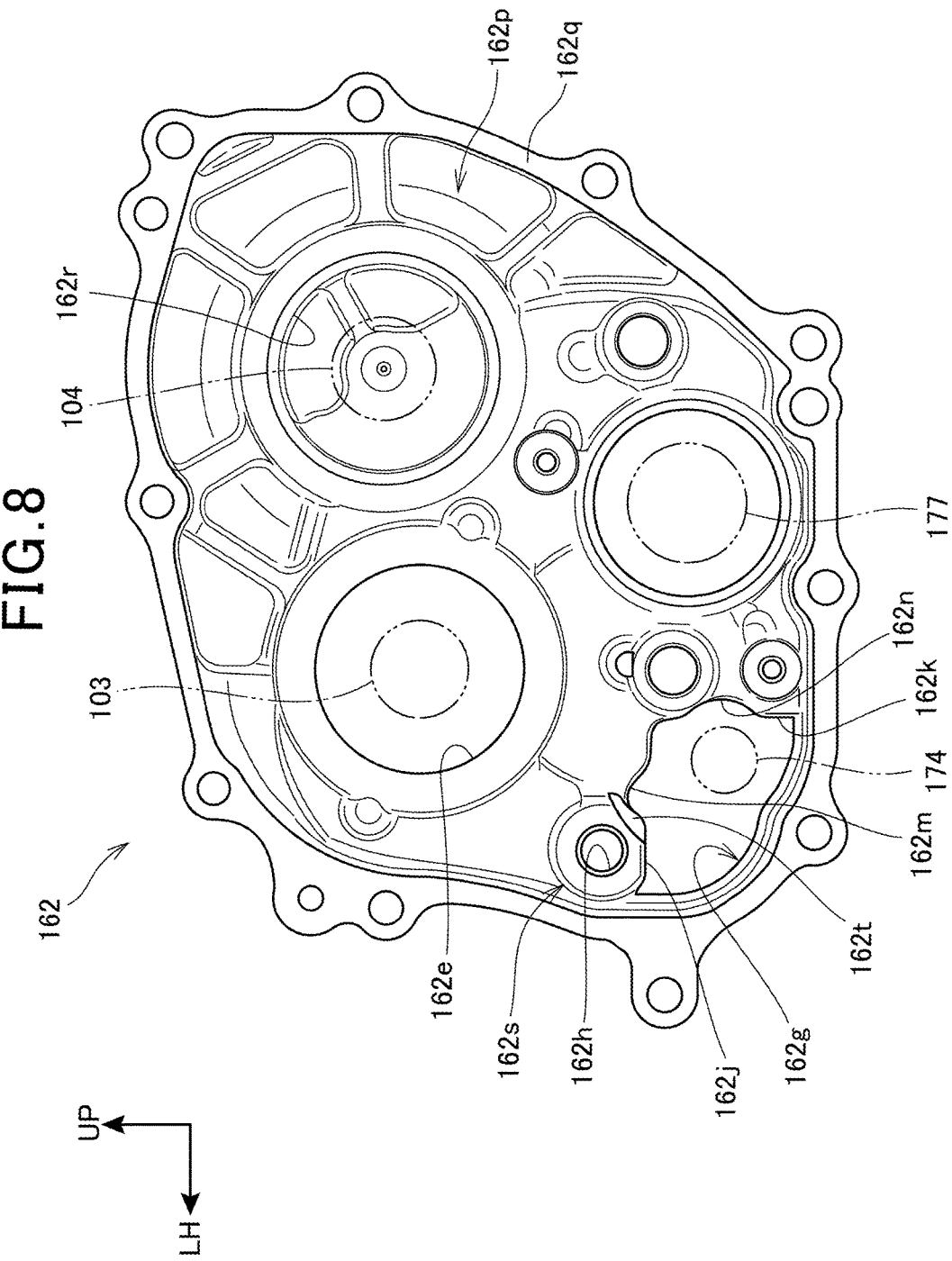
FIG. 8 is a rear view showing the transmission holder.

FIG. 7 is a front view showing the transmission holder 162. FIG. 8 is a rear view showing the transmission holder 162.

As shown in FIG. 7, formed on the inside of the peripheral wall 162b of the transmission holder 162 are: a bearing fitting hole 162e fitted with a bearing that supports the front end portion of the main shaft 103; a drum front hole 162f formed at the front of the shift drum 177; a shaft insertion opening portion 162g into which the shift shaft 174 is inserted; and a bar insertion hole 162h formed as a circular hole through which the torsion bar assembly 173 is passed. The counter shaft 104 coincides in the forward-rearward direction with a part of the peripheral wall 162b which part is on the right of the main shaft 103.

The shaft insertion opening portion 162g is formed in a substantially sectorial shape as viewed from the front so as to penetrate a lower left portion of the transmission holder 162. Two linear portions 162j and 162k forming substantially a right angle to each other are disposed at edges of the shaft insertion opening portion 162g. Further formed in the linear portions 162j and 162k are respective clearance portions 162m and 162n recessed so as to avoid interference with the shift shaft 174 when the shift shaft 174 is passed through the shaft insertion opening portion 162g for assembly. In addition, a part of edges of the shaft insertion opening portion 162g are formed along an angular portion of the peripheral wall 162b of the transmission holder 162.

The bar insertion hole 162h is disposed above and in proximity to a part on a left side of the clearance portion 162m in the linear portion 162j of the shaft insertion opening portion 162g.

The bar insertion hole 162h is opened in a bottom surface 162y on the inside of the peripheral wall 162b in the transmission holder 162. In addition, the shaft insertion opening portion 162g is opened in the bottom surface 162y and a part of the peripheral wall 162b. In FIG. 6 and FIG. 7, the bottom surface 162y is disposed so as to be offset rearward of the peripheral wall front end surface 162c of the transmission holder 162.

As shown in FIG. 8, an inner surface 162p of the transmission holder 162 is provided with an endless rear edge surface 162q forming an outer edge and a recessed portion 162r located on the inside of the rear edge surface 162q and on the right of the bearing fitting hole 162e, the recessed portion 162r having a circular outline.

The rear edge surface 162q is attached to the front end surface 211b (see FIG. 14) of the transmission case main body 161 (see FIG. 5). A bearing that supports the counter shaft 104 is fitted into the recessed portion 162r.

In addition, a boss portion 162s in which the bar insertion hole 162h is opened is formed on the inner surface 162p of the transmission holder 162. The linear portion 162j and the clearance portion 162m of the shaft insertion opening portion 162g are formed at a lower edge of the boss portion 162s. A lower portion of the boss portion 162s is provided with a machined portion 162t that is cut to avoid interference with the shaft gear 174b (see FIG. 9) of the shift shaft 174 (see FIG. 5).

Figure 9:
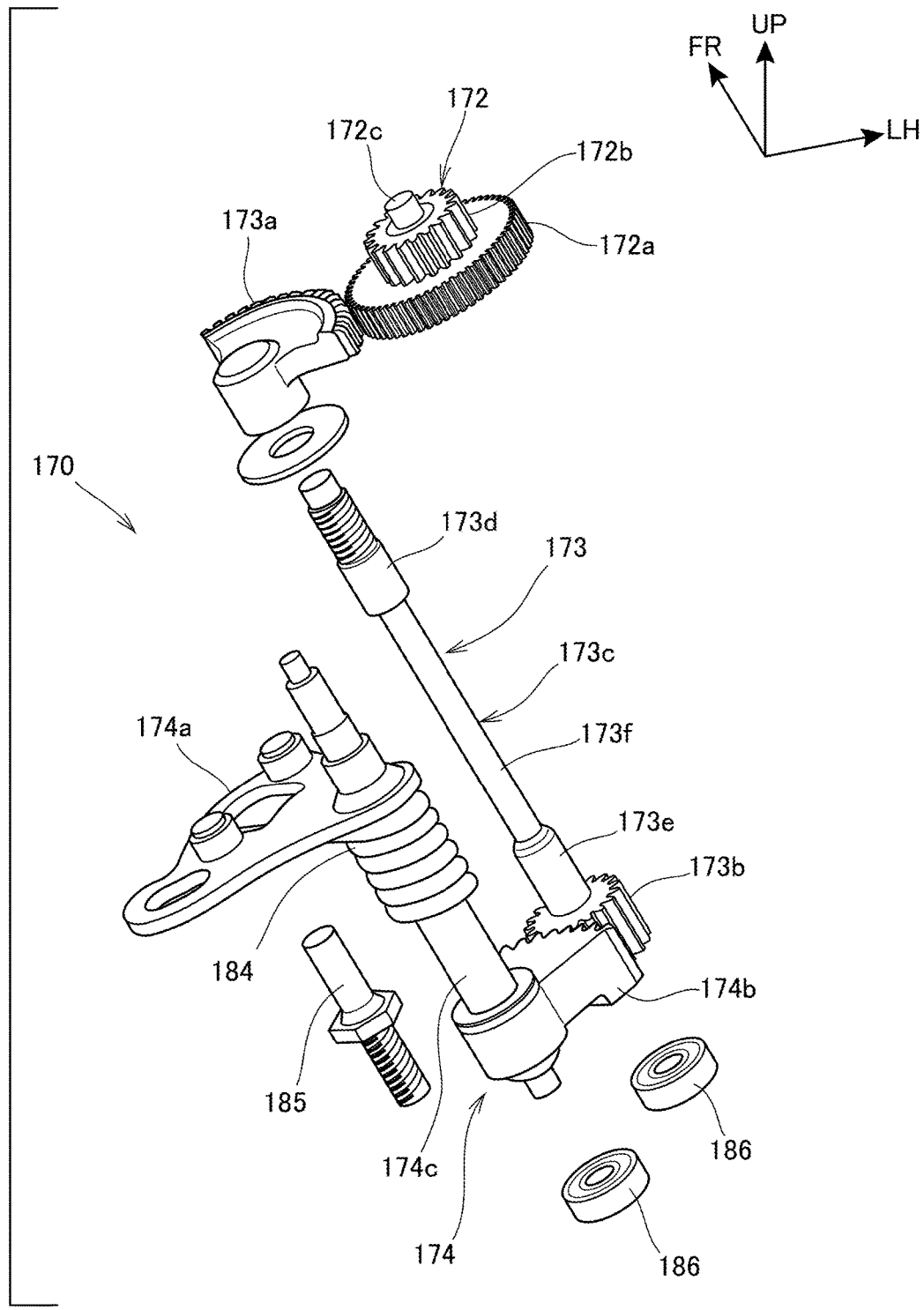
FIG. 9 is an exploded perspective view showing a part of the constitution of a speed change operation mechanism in the automatic speed change transmission.

FIG. 9 is an exploded perspective view showing a part of the constitution of the speed change operation mechanism 170 in the automatic speed change transmission 82.

The reduction gear 172 includes the large-diameter gear 172a and the small-diameter gear 172b disposed adjacent to each other. Shaft portions 172c (only one shaft portion 172c is shown) are each formed so as to project from the large-diameter gear 172a and the small-diameter gear 172b, respectively. The shaft portion 172c is rotatably supported by the transmission cover 163 (see FIG. 6) and the transmission sub-cover 164 (see FIG. 6).

The torsion bar assembly 173 is constituted of a torsion bar 173c, the sector gear 173a attached to a front end portion of the torsion bar 173c, and the rear end gear 173b formed integrally with a rear end portion of the torsion bar 173c. The torsion bar 173c is formed integrally of large-diameter portions 173d and 173e formed in the front end portion and the rear end portion and a small-diameter portion 173f formed between the large-diameter portions 173d and 173e, the small-diameter portion 173f being a shaft thinner than the large-diameter portions 173d and 173e. The small-diameter portion 173f is a thin shaft, and can therefore be decreased in torsion spring constant. Torsion of the small-diameter portion 173f can cushion a speed change shock occurring in the speed change operation mechanism 170 at a time of speed change operation.

The shift shaft 174 is constituted of: a rod-shaped shaft portion 174c; the shift arm 174a attached in a position nearer to a rear end portion of the shaft portion 174c than a front end portion of the shaft portion 174c; and the shaft gear 174b attached to the rear end portion of the shaft portion 174c. A torsion coil spring 184 is wound around the shaft portion 174c. The torsion coil spring 184 is disposed such that both end portions of the torsion coil spring 184 are in proximity to the rear of the shift arm 174a and extend substantially in parallel with the rear of the shift arm 174a. An engaging piece formed so as to bend on the shift arm 174a having the shape of a plate and a stopper pin 185 fixed to the transmission holder 162 (see FIG. 5) are arranged between both end portions of the torsion coil spring 184. Such a structure can regulate swinging of the shift arm 174a, and return the shift arm 174a to an initial swinging position. Incidentally, reference symbols 186, 186 denote bearings that support the respective rear end portions of the torsion bar assembly 173 and the shift shaft 174, and which are attached to the transmission case main body 161 (see FIG. 5).

Figure 10:
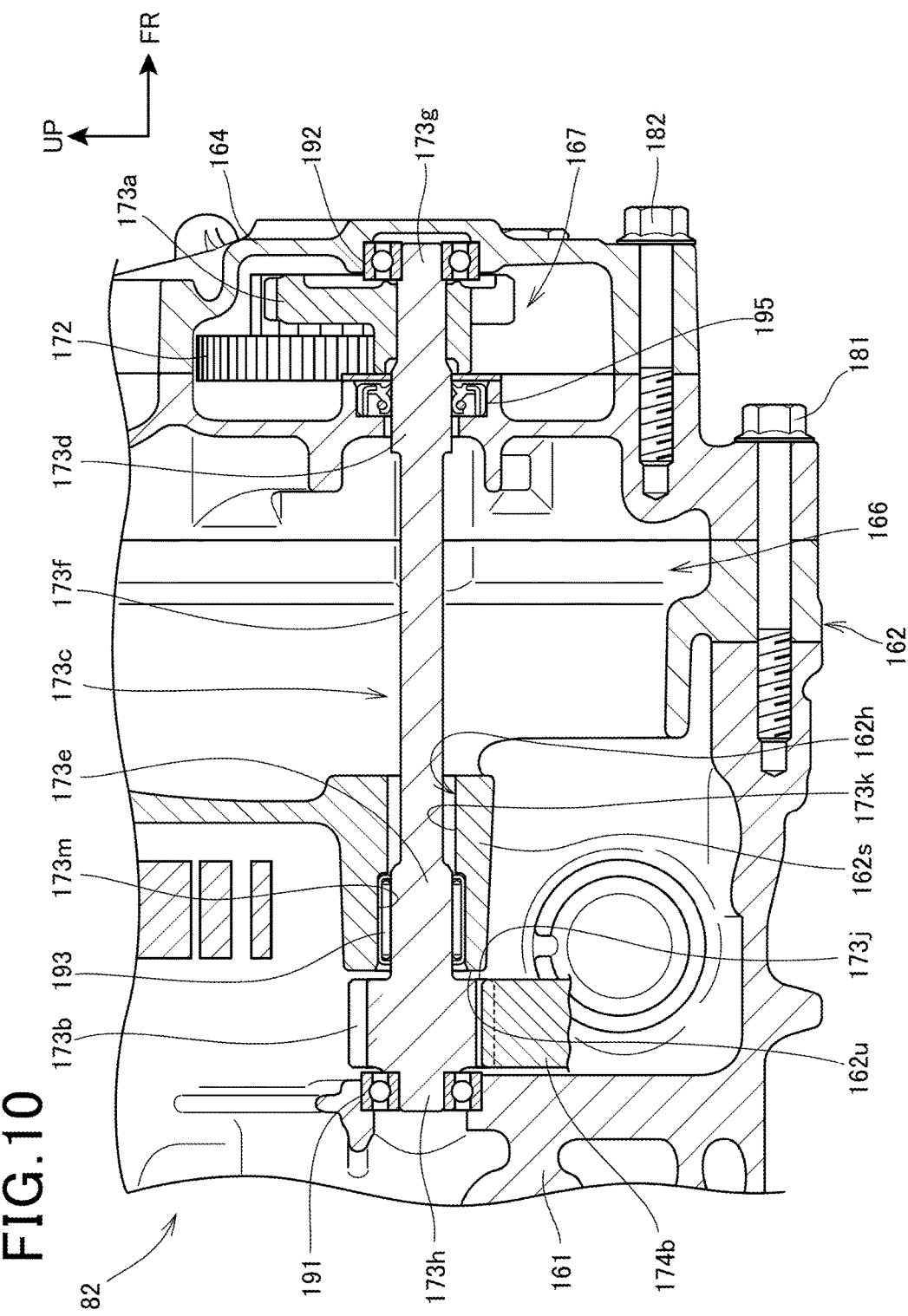
FIG. 10 is a sectional view showing a front lower portion of the transmission.

FIG. 10 is a sectional view showing a front lower portion of the transmission 82.

A front end shaft portion 173g and a rear end shaft portion 173h are molded integrally with the front end portion and the rear end portion, respectively, of the torsion bar 173c. As a method of supporting the torsion bar 173c, the rear end shaft portion 173h is supported by the transmission case main body 161 via a bearing (ball bearing) 191, and the front end shaft portion 173g is supported by the transmission sub-cover 164 via a bearing (ball bearing) 192. In addition, the large-diameter portion 173e of the torsion bar 173c is supported by the boss portion 162s of the transmission holder 162 via a bearing (needle bearing) 193. A rear end surface 162u of the boss portion 162s is a part extending rearward so as to be in proximity to a side surface 173j of the rear end gear 173b of the torsion bar 173c. The bar insertion hole 162h of the boss portion 162s is constituted of: a small-diameter hole 173k having an inside diameter larger than the diameter of the large-diameter portion 173e of the torsion bar 173c; and a large-diameter hole 173m disposed in the rear of the small-diameter hole 173k and having an inside diameter larger than that of the small-diameter hole 173k.

The inside diameter of the small-diameter hole 173k is made larger than that of the large-diameter portion 173e of the torsion bar 173c. Thus, interference between an inner circumferential surface of the small-diameter hole 173k and an outer circumferential surface of the large-diameter portion 173e can be avoid. In addition, the large-diameter hole 173m is disposed in the rear of the small-diameter hole 173k, and the bearing (needle bearing) 193 is fitted in the large-diameter hole 173m. Thus, the large-diameter portion 173e can be supported in a position closer to the rear end gear 173b. The occurrence of bending of the torsion bar 173c is thereby suppressed. It is therefore possible to improve contact at a time of meshing of the rear end gear 173b with the shaft gear 174b of the shift shaft 174 (see FIG. 9), and prevent uneven wear. Incidentally, reference symbol 195 denotes an oil seal for sealing between the transmission cover 163 and the large-diameter portion 173d.

Figure 11:
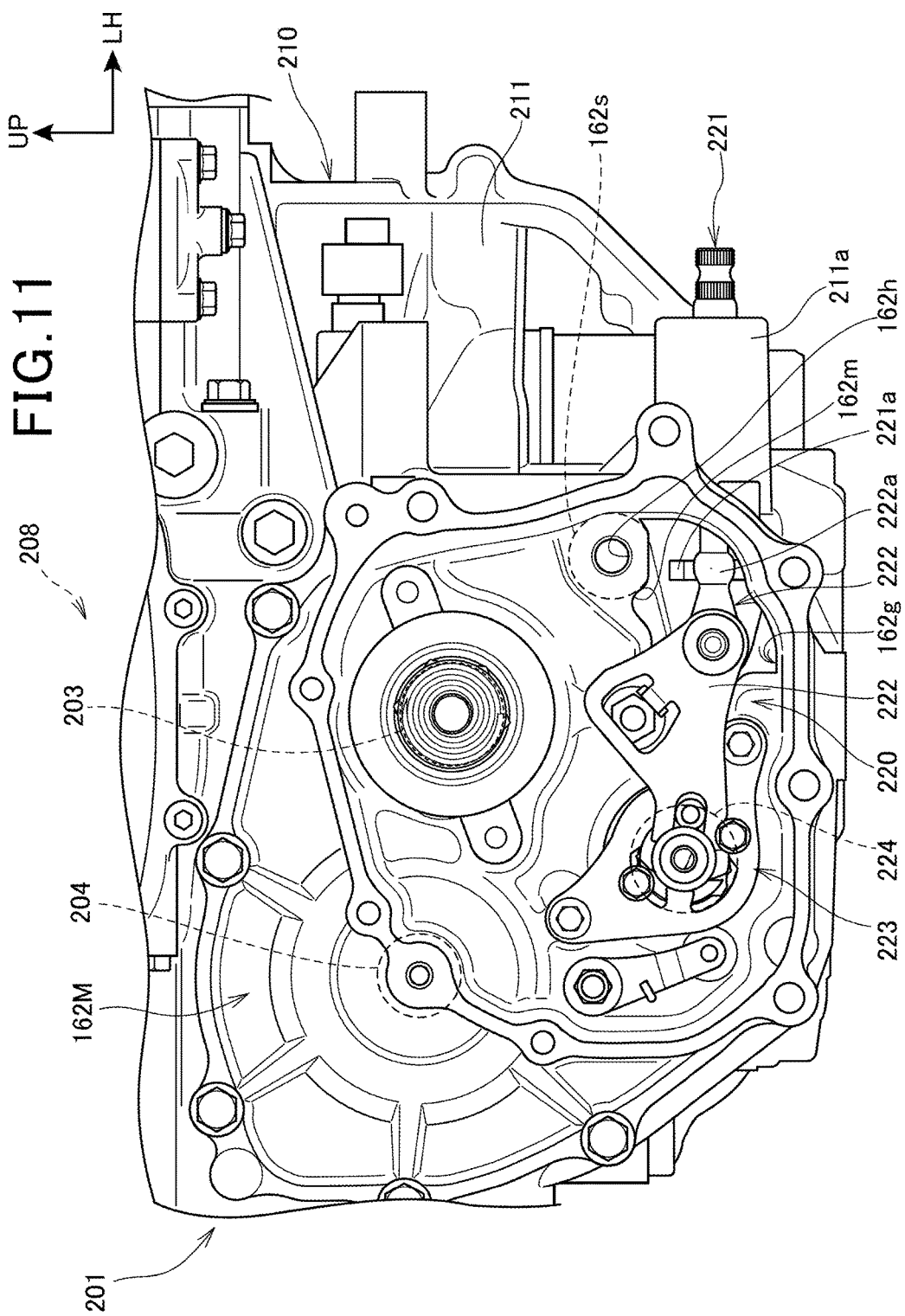
FIG. 11 is a fragmentary front view showing a manual speed change transmission.
Figure 12:
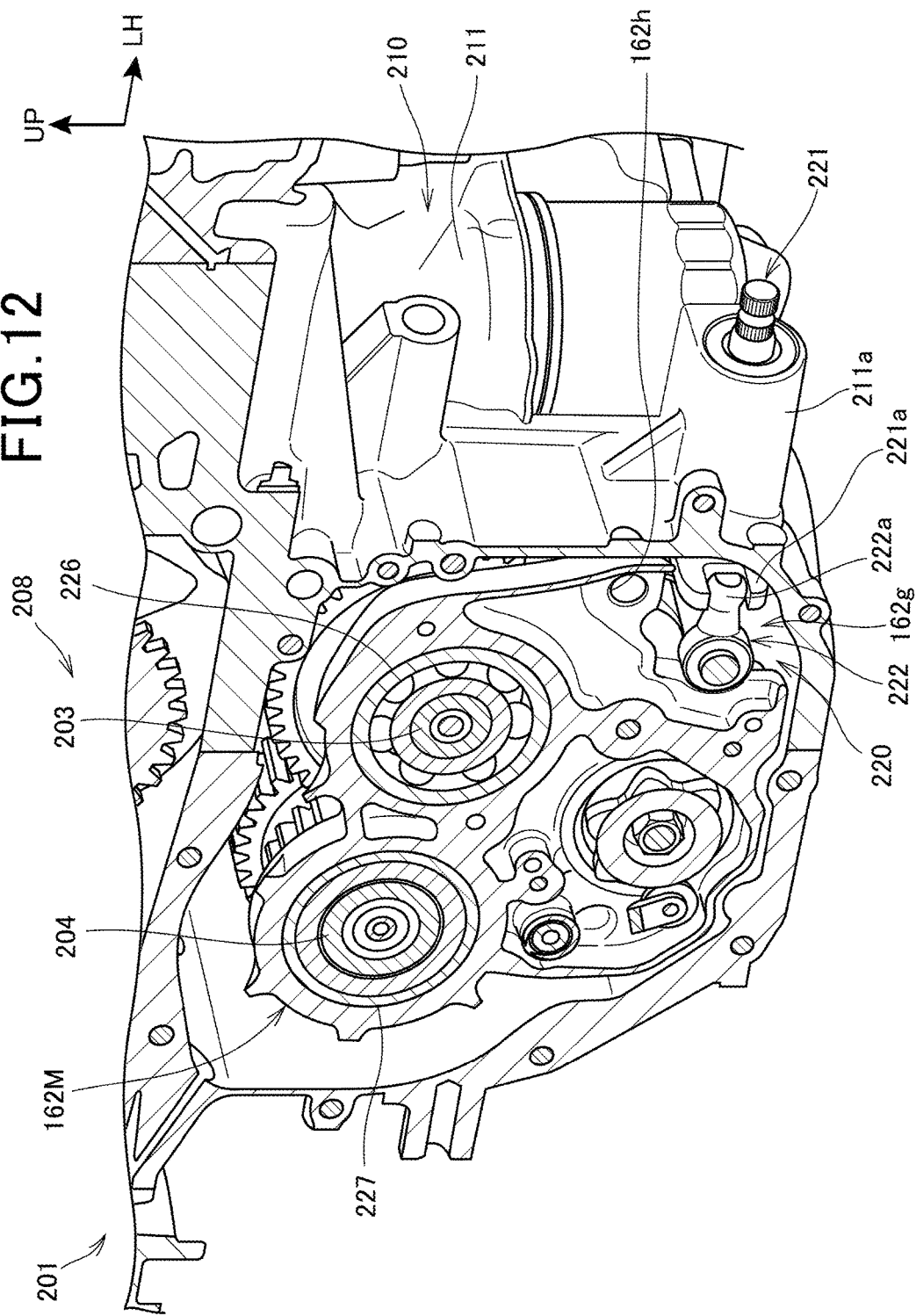
FIG. 12 is a perspective view showing a state in which a transmission holder is sectioned in a direction orthogonal to a main shaft and a counter shaft.

FIG. 11 is a fragmentary front view showing a manual speed change transmission 201. FIG. 12 is a perspective view showing a state in which a transmission holder 162M is sectioned in a direction orthogonal to a main shaft 203 and a counter shaft 204. Incidentally, constitutions identical to those of the automatic speed change transmission 82 shown in FIG. 5 are identified by the same reference symbols, and detailed description thereof will be omitted.

As shown in FIG. 11, the transmission 201 includes the main shaft 203 below a crankshaft and the counter shaft 204 on the right of the main shaft 203. The main shaft 203 and the counter shaft 204 are each disposed in parallel with the crankshaft. The main shaft 203 and the counter shaft 204 described above constitute a speed change shaft 208.

The main shaft 203 and the counter shaft 204 are provided with a plurality of stages of gear trains capable of selective power transmission at different gear ratios. Meshing combinations of gear elements of these gear trains are made by shift operation of a driver.

The transmission 201 includes: a transmission case 210 that houses shafts (the main shaft 203, the counter shaft 204, and the like), speed change gears, and the like; and a speed change operation mechanism 220 that switches a speed change stage. The transmission case 210 includes a transmission case main body 211, the transmission holder 162M detachably attached to a front end portion of the transmission case main body 211, and a transmission cover (not shown) attached to a front end portion of the transmission holder 162M. The transmission case main body 211 has a structure identical to that of the transmission case main body 161 shown in FIG. 4 and FIG. 5.

In FIG. 11, the transmission holder 162M is a part obtained by omitting only the machined portion 162t from the transmission holder 162 shown in FIG. 7 and FIG. 8. That is, the transmission holder 162 is obtained by forming the machined portion 162t in the boss portion 162s of the transmission holder 162M. The transmission holder 162M can be said to be a material for the transmission holder 162.

The speed change operation mechanism 220 includes a shift pedal shaft 221, a shift shaft 222, a shift drum 224, and shift forks 178 (see FIG. 14). The speed change operation mechanism 220 receives an input motion provided by a speed change operation, and selects a speed change stage gear, thereby switching a speed change stage.

The shift pedal shaft 221 is a shaft to which a shift pedal is attached. The shift pedal shaft 221 is rotatably supported by a case boss portion 211a formed so as to project from a left side surface of the transmission case main body 211 to the outside in the vehicle width direction. The shift shaft 222 is disposed in parallel with the main shaft 203. The shift shaft 222 includes: a rear shift arm 222a that engages with a front end portion of the shift pedal shaft 221; and a front shift arm 222b attached in front of the rear shift arm 222a. The front shift arm 222b is coupled to the shift drum 224 via a coupling mechanism 223. The shift pedal shaft 221 and the shift shaft 222 described above are arranged so as to be orthogonal to each other. A plurality of the shift forks 178 (see FIG. 14) are coupled to the shift drum 224.

In the manual speed change transmission 201, the shift shaft 222 is inserted in the shaft insertion opening portion 162g, but the bar insertion hole 162h of the transmission holder 162M is not used.

As shown in FIG. 12, respective front end portions of the main shaft 203 and the counter shaft 204 are respectively supported by bearings 226 and 227 disposed in the transmission holder 162M.

The front end portion of the shift pedal shaft 221 is provided with an engaging portion 221a having a bifurcated shape. The engaging portion 221a engages with the rear shift arm 222a of the shift shaft 222.

Figure 13:
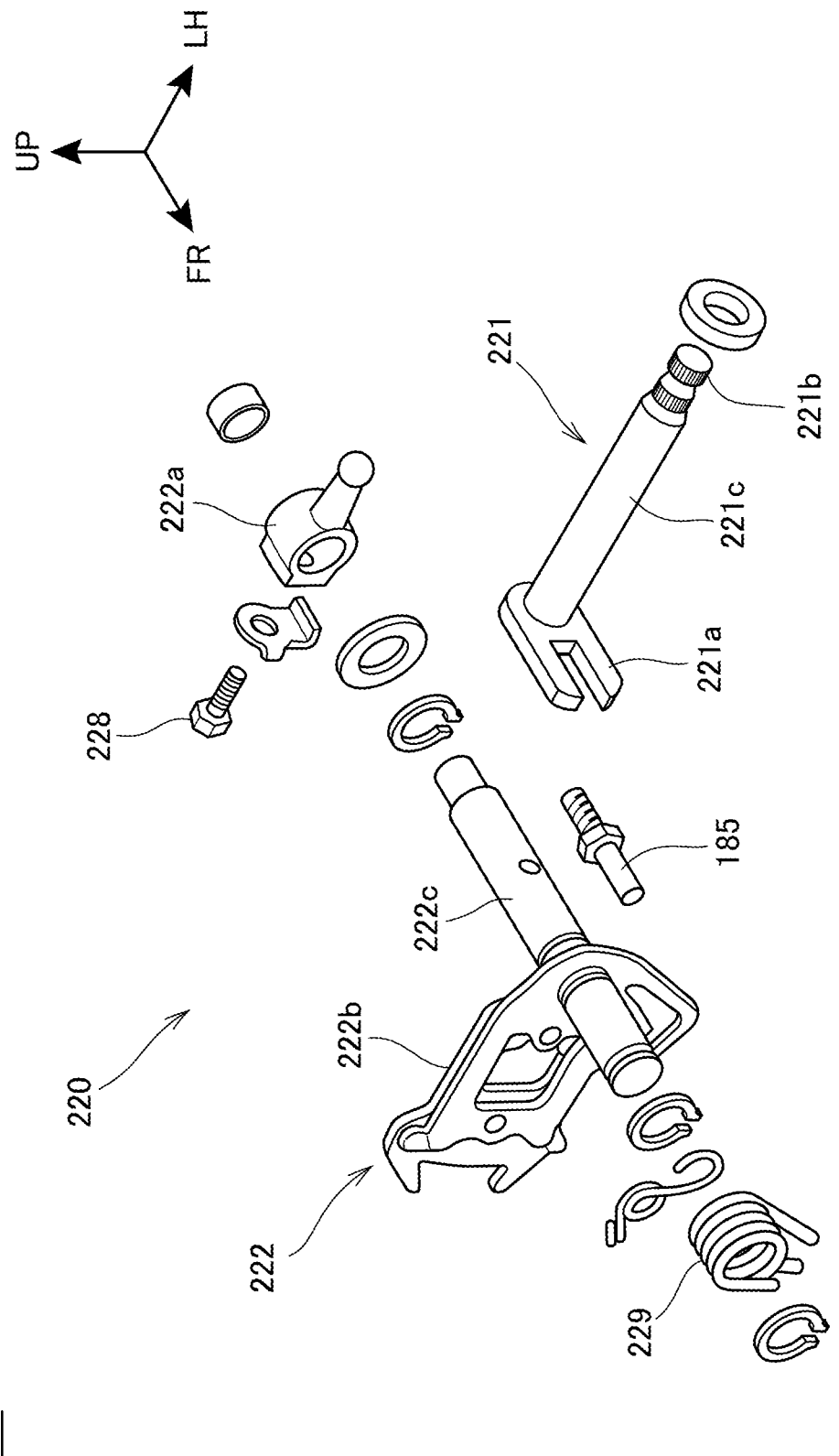
FIG. 13 is an exploded perspective view showing a part of the constitution of a speed change operation mechanism in the manual speed change transmission.

FIG. 13 is an exploded perspective view showing the speed change operation mechanism 220 in the manual speed change transmission 201.

A detent portion 221b for non-rotatable coupling to the shift pedal is formed at a left end portion in the vehicle width direction of the shift pedal shaft 221, and the engaging portion 221a is fixed to a right end portion in the vehicle width direction of the shift pedal shaft 221. The shift shaft 222 has the rear shift arm 222a attached to an intermediate portion in an axial direction of a rod-shaped shaft portion 222c by a bolt 228, and has the front shift arm 222b fixed near to a front end portion of the shaft portion 222c.

A torsion coil spring 229 is wound around the shaft portion 222c. The torsion coil spring 229 is disposed such that both end portions of the torsion coil spring 229 are in proximity to the rear of the front shift arm 222b and extend substantially in parallel with the rear of the front shift arm 222b. An engaging piece formed so as to bend on the front shift arm 222b having the shape of a plate and a stopper pin 185 fixed to the transmission holder 162M are arranged between both end portions of the torsion coil spring 229. Such a structure can regulate swinging of the front shift arm 222b, and return the front shift arm 222b to an initial swinging position.

FIG. 14 is a sectional view showing a power unit 230 including the transmission 201.

The power unit 230 includes an internal combustion engine 81 and the transmission 201.

The transmission 201 includes a reduction gear mechanism 111, a clutch 112, a clutch shaft 114, a main shaft 103, the transmission holder 162M, a cam damper 118, a main shaft gear group 121, a shift fork shaft 179, and the plurality of shift forks 178.

The power of a crankshaft 101 is transmitted to an input side of the clutch 112 via the reduction gear mechanism 111. The clutch shaft 114 has one end attached to an output side of the clutch 112, and has an intermediate portion supported by a bearing 113 disposed in a crankcase 83. The main shaft 103 has one end relatively rotatably supported by another end of the clutch shaft 114, and has another end supported by the transmission holder 162M of the transmission case main body 161 via a bearing 226. The clutch shaft 114 and the main shaft 103 described above constitute a speed change shaft 125.

A front end of the transmission case 210 of the transmission 201 is an open end. The transmission holder 162M is attached to a front end surface 211b of the transmission case main body 211 of the transmission case 210. A bottom surface 162y (see FIG. 7) of a peripheral wall 162b (see FIG. 6) of the transmission holder 162M is a part in which the shaft insertion opening portion 162g (see FIG. 7) is formed. The bottom surface 162y is disposed in a position offset from the front end surface 211b of the transmission case main body 211 to the inside of the transmission case main body 211.

Thereby, projections and depressions in the forward-rearward direction of the transmission holder 162M in the vicinity of the open end of the transmission case main body 211 can be formed larger, so that the rigidity of the transmission holder 162M can be enhanced. It is therefore possible to compensate for a decrease in the rigidity due to the formation of the shaft insertion opening portion 162g.

The cam damper 118 is disposed between the clutch shaft 114 and the main shaft 103. The cam damper 118 rotates relatively when an excessive torque exceeding a predetermined torque or an excessive torque variation is input from the clutch shaft 114 to the main shaft 103. The cam damper 118 thereby cushions the transmission of the excessive torque or the excessive torque variation to the main shaft 103. The main shaft gear group 121 is constituted of a plurality of speed change gears arranged on the main shaft 103.

The shift fork shaft 179 is a hollow shaft having both end portions thereof supported by a shaft supporting portion 83e formed in the transmission case main body 211 and a shaft supporting portion 162v formed on the transmission holder 162M. The shift forks 178 are movably supported by the shift fork shaft 179, and move predetermined speed change gears of the main shaft gear group 121 on the main shaft 103 in the axial direction as the shift drum 224 (see FIG. 11) rotates according to a speed change operation, so that a speed change stage can be selected.

Caps 145, 145 made of rubber are fitted to both end portions of the shift fork shaft 179. The caps 145, 145 as elastic members fitted to both end portions of the shift fork shaft 179 can suppress the occurrence of a striking sound when the caps 145 hit a bottom surface 83g of a shaft supporting hole 83f formed in the shaft supporting portion 83e of the transmission case main body 211 or a bottom surface 162x of a shaft supporting hole 162w formed in the shaft supporting portion 162v of the transmission holder 162M while the shift fork shaft 179 moves in the axial direction in the shaft supporting hole 83f and the shaft supporting hole 162w as the shift forks 178 move.

As shown in FIG. 5 and FIGS. 8 to 10 described above, in the transmission structure for a vehicle, the transmission structure including the transmission 82 having a plurality of speed change stages, the transmission 82 including the speed change operation mechanism 170 that has the shift forks 178 as an output portion receiving an input motion produced by the electric motor 171 as an actuator constituting an operation driving source and changing a speed change stage of the transmission 82, and the transmission case 160 that houses the speed change operation mechanism 170, a part of the speed change operation mechanism 170 being the torsion bar 173c as a torque transmitting member, and the rear end gear 173b as a gear being disposed on an end portion of the torsion bar 173c, the transmission case 160 includes the boss portion 162s as a holding portion holding an intermediate portion in the axial direction of the torsion bar 173c.

According to this constitution, when the torque of the torsion bar 173c is transmitted from the input side end portion to the output side end portion of the torsion bar 173c, the boss portion 162s suppresses bending deformation of the torsion bar 173c, thereby making it possible to prevent uneven wear resulting from partial contact of the rear end gear 173b with the mating gear meshing with the rear end gear 173b, and thus improve the durability of the rear end gear 173b and the mating gear.

In addition, as shown in FIG. 9, the rear end gear 173b is molded integrally with the output side end portion of the torsion bar 173c. Hence, it is possible to reduce the number of parts and the number of assembly man-hours of the speed change operation mechanism 170, and thus reduce cost.

In addition, as shown in FIG. 10, a part of the torsion bar 173c which part is supported by the boss portion 162s is formed so as to have a larger diameter than that of a central portion in the axial direction of the torsion bar 173c. Thus, the bending deformation can be suppressed as much as possible at the large-diameter part of the torsion bar 173c, so that the durability of the rear end gear 173b can be improved.

In addition, the bearing 193 is disposed between the boss portion 162s and the torsion bar 173c. It is thus possible to suppress the bending deformation while reducing the rotational resistance of the torsion bar 173c.

In addition, an end portion of the torsion bar 173c on an opposite side of the rear end gear 173b from the boss portion 162s is rotatably supported by the transmission case 160. Thus, inclination of the rear end gear 173b can be suppressed by supporting both sides of the rear end gear 173b by the boss portion 162s and the transmission case 160. It is therefore possible to prevent wear due to partial contact of the rear end gear 173b, and thereby improve the durability and transmission efficiency of the rear end gear 173b.

In addition, as shown in FIG. 8 and FIG. 10, the transmission case 160 includes the removable transmission holder 162 supporting one end of the speed change shaft 108 of the transmission 82, and the boss portion 162s is formed integrally with the transmission holder 162. Thus, the boss portion 162s can be supported by the transmission holder 162 supporting the speed change shaft 108 of the transmission 82. An increase in the number of parts is therefore suppressed. In addition, by forming the boss portion 162s on the transmission holder 162, it is possible to increase a degree of freedom of the formation of the boss portion 162s as compared with formation of the boss portion on the main body side of the transmission case 160.

In addition, the transmission holder 162 has a bar insertion hole 162h that the torsion bar 173c passes through, and the boss portion 162s is formed so as to protrude in a tubular shape from a circumferential edge of the bar insertion hole 162h as the circular through hole. Thus, by protruding the boss portion 162s, it is possible to reinforce the periphery of the shaft insertion opening portion 162g, and compensate for a decrease in rigidity due to the formation of the shaft insertion opening portion 162g.

In addition, an end of the boss portion 162s extends to a position in proximity to a side of the rear end gear 173b. Thus, the torsion bar 173c can be supported in closer vicinity to the rear end gear 173b. The partial contact of the rear end gear 173b is consequently further reduced, so that the transmission efficiency and durability of the rear end gear 173b can be improved.

The foregoing embodiment is merely illustrative of one mode of the present invention, and is susceptible of arbitrary modifications and applications without departing from the spirit of the present invention.

The present invention is not only applicable to the motorcycle 10, but also is applicable to vehicles including other than the motorcycle 10.

DESCRIPTION OF REFERENCE SYMBOLS

10 Motorcycle (vehicle)
82, 201 Transmission
108, 208 Speed change shaft
160, 210 Transmission case
161, 211 Transmission case main body
162, 162M Transmission holder
162g Shaft insertion opening portion (through hole)
162s Boss portion (holding portion)
170, 220 Speed change operation mechanism
171 Electric motor (actuator)
173b Rear end gear (gear)
173c Torsion bar
178 Shift fork (output portion)
193 Bearing

The invention claimed is:

1. A transmission structure for a vehicle, the transmission structure comprising:
a transmission having a plurality of speed change stages, the transmission including a speed change operation mechanism and a transmission case that houses the speed change operation mechanism,
the speed change operation mechanism including:
an actuator as an operation driving source;
a reduction gear meshing with the actuator;
a torsion bar assembly;
a shift shaft;
a shift drum coupled to the shift shaft; and
a shift fork that is coupled to the shift drum and is engaged with a main shaft gear group provided to a main shaft of the transmission and with a counter shaft gear group provided to a counter shaft of the transmission,
the torsion bar assembly including:
the torsion bar, as a torque transmitting member, configuring a shaft;
a first gear that is attached to one end portion of the torsion bar and meshes with the reduction gear; and
a second gear disposed on another end portion of the torsion bar and meshing with a gear of the shift shaft;
the transmission case includes a holding portion holding an intermediate portion of the torsion bar in an axial direction of the torsion bar, the intermediate portion being located at a position away from the second gear.

2. The transmission structure for a vehicle according to claim 1, wherein
the second gear is molded integrally with an output side end portion of the torsion bar.

3. The transmission structure for a vehicle according to claim 1, wherein
a part of the torsion bar, the part being supported by the holding portion, is formed so as to have a larger diameter than a diameter of a central portion in the axial direction of the torsion bar.

4. The transmission structure for a vehicle according to claim 1, wherein
a bearing is disposed between the holding portion and the torsion bar.

5. The transmission structure for a vehicle according to claim 1, wherein
an end portion of the torsion bar on an opposite side of the second gear from the holding portion is rotatably supported by the transmission case.

6. The transmission structure for a vehicle according to claim 1, wherein
the transmission case includes a removable transmission holder supporting one end of a speed change shaft of the transmission, and the holding portion is formed integrally with the transmission holder.

7. The transmission structure for a vehicle according to claim 6, wherein
the transmission holder has a circular through hole that the torsion bar passes through, and the holding portion is formed so as to protrude in a tubular shape from a circumferential edge of the circular through hole.

8. The transmission structure for a vehicle according to claim 1, wherein
the holding portion is formed so as to protrude in a tubular shape,
the holding portion has a circular through hole that the torsion bar passes through in an axial direction of the holding portion, and
an end of the holding portion extends to a position in proximity to a side of the second gear to face the side of the second gear.

9. The transmission structure for a vehicle according to claim 2, wherein
a part of the torsion bar, the part being supported by the holding portion, is formed so as to have a larger diameter than a diameter of a central portion in the axial direction of the torsion bar.

10. The transmission structure for a vehicle according to claim 2, wherein
a bearing is disposed between the holding portion and the torsion bar.

11. The transmission structure for a vehicle according to claim 3, wherein
a bearing is disposed between the holding portion and the torsion bar.

12. The transmission structure for a vehicle according to claim 9, wherein
a bearing is disposed between the holding portion and the torsion bar.

13. The transmission structure for a vehicle according to claim 2, wherein
an end portion of the torsion bar on an opposite side of the second gear from the holding portion is rotatably supported by the transmission case.

14. The transmission structure for a vehicle according to claim 3, wherein
an end portion of the torsion bar on an opposite side of the second gear from the holding portion is rotatably supported by the transmission case.

15. The transmission structure for a vehicle according to claim 4, wherein
an end portion of the torsion bar on an opposite side of the second gear from the holding portion is rotatably supported by the transmission case.

16. The transmission structure for a vehicle according to claim 9, wherein
an end portion of the torsion bar on an opposite side of the second gear from the holding portion is rotatably supported by the transmission case.

17. The transmission structure for a vehicle according to claim 10, wherein
an end portion of the torsion bar on an opposite side of the second gear from the holding portion is rotatably supported by the transmission case.

18. The transmission structure for a vehicle according to claim 11, wherein
an end portion of the torsion bar on an opposite side of the second gear from the holding portion is rotatably supported by the transmission case.

19. The transmission structure for a vehicle according to claim 12, wherein
an end portion of the torsion bar on an opposite side of the second gear from the holding portion is rotatably supported by the transmission case.

20. The transmission structure for a vehicle according to claim 1, wherein
a part of the torsion bar, the part being supported by the holding portion, is formed so as to have a larger diameter than a diameter of a central portion in the axial direction of the torsion bar,
the holding portion has a circular through hole that the torsion bar passes through,
the circular through hole is longer than the part with the larger diameter in the axial direction of the torsion bar, and
the through hole is constituted of: a small-diameter hole having an inside diameter larger than the diameter of the part with the larger diameter; and a large-diameter hole disposed in a side of the second gear with respect to the small-diameter hole and having an inside diameter larger than that of the small-diameter hole.

* * * * *